No. 881,260. PATENTED MAR. 10, 1908.
G. F. PETTIT.
SHOCK HANDLER.
APPLICATION FILED MAR. 29, 1907.
2 SHEETS—SHEET 1.
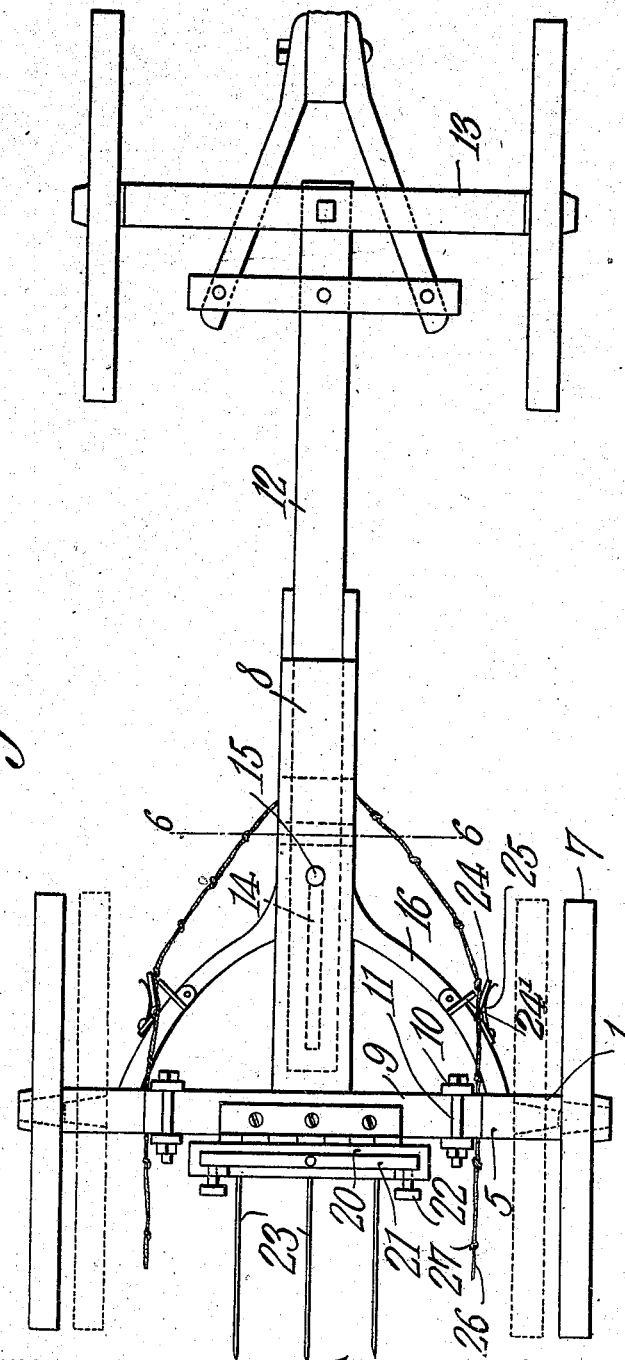
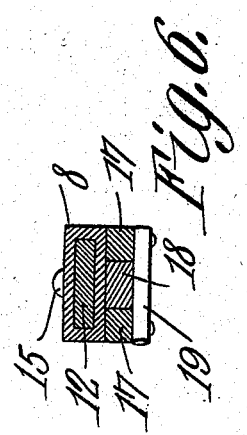
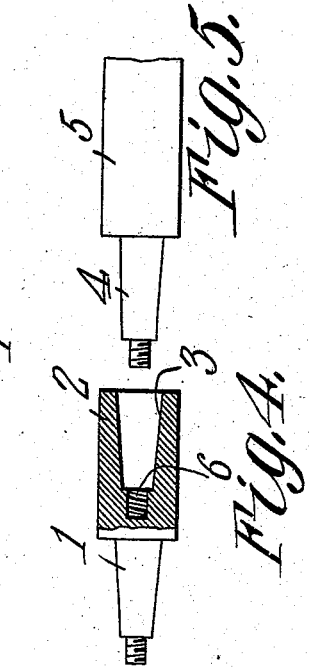
WITNESSES: George F. Pettit, INVENTOR.
By C. A. Snow & Co.
ATTORNEYS
THE NORRIS PETERS CO., WASHINGTON, D. C.

No. 881,260.
G. F. PETTIT.
SHOCK HANDLER.
APPLICATION FILED MAR. 29, 1907.
PATENTED MAR. 10, 1908.
2 SHEETS—SHEET 2.
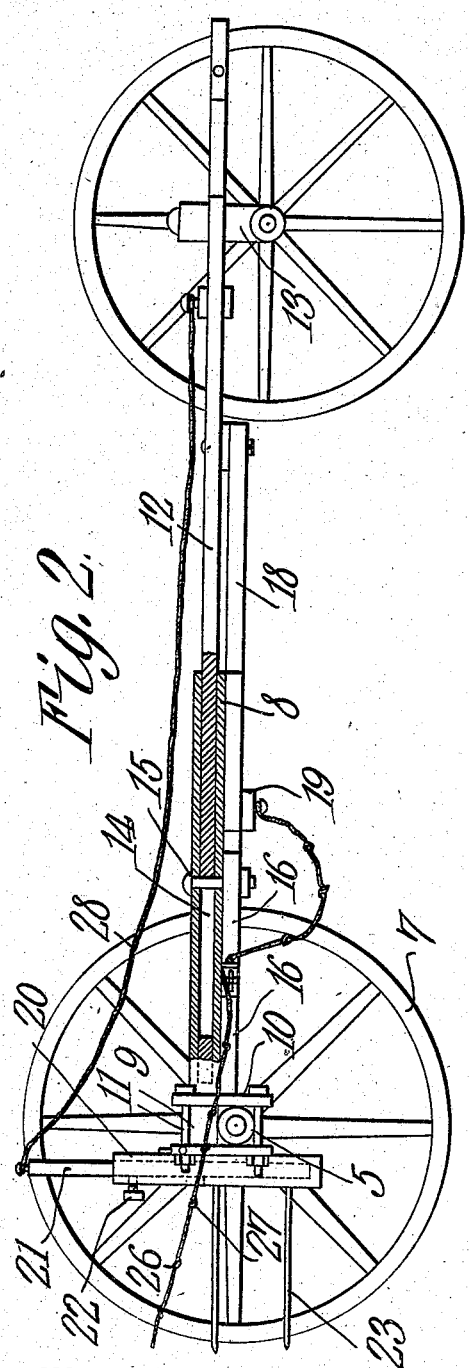
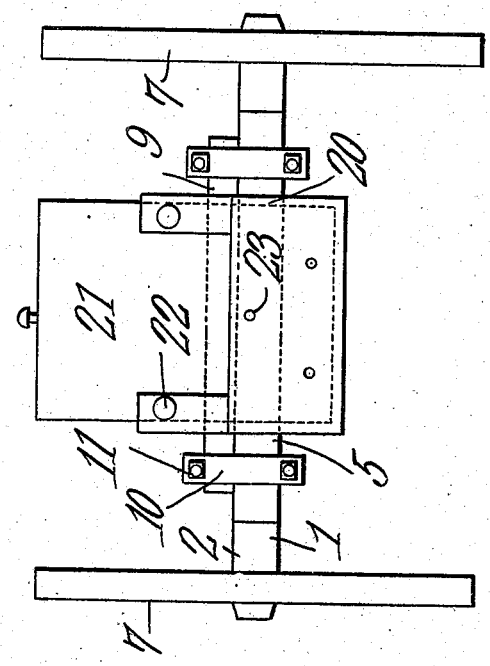
WITNESSES:
George F. Pettit,
INVENTOR.
By C. A. Snow & Co.
ATTORNEYS

UNITED STATES PATENT OFFICE.

GEORGE F. PETTIT, OF SPRINGFIELD, ILLINOIS.

SHOCK-HANDLER.

No. 881,260.　　　　Specification of Letters Patent.　　　Patented March 10, 1908.

Application filed March 29, 1907. Serial No. 365,428.

*To all whom it may concern:*

Be it known that I, GEORGE F. PETTIT, a citizen of the United States, residing at Springfield, in the county of Sangamon and State of Illinois, have invented a new and useful Shock-Handler, of which the following is a specification.

This invention has relation to shock handling devices and it consists in the novel construction and arrangement of its parts as hereinafter shown and described.

The object of the invention is to provide a shock handler in the form of a dray or wagon and which is provided with appliances for engaging and impaling the shock and means for tilting or swinging the shock into a horizontal position in order that it may be readily transported over the ground.

In the accompanying drawing:—Figure 1 is a top plan view of the shock handler. Fig. 2 is a side elevation of the same with parts removed and parts in section. Fig. 3 is a rear elevation of the shock handler. Fig. 4 is a side elevation partly in section of, an axle extension used upon the handler. Fig. 5 is a side elevation of an end portion of the axle, and Fig. 6 is a transverse sectional view through the box and coupling cut on the line 6—6 of Fig. 1.

In the present invention the axles and wheels usually employed in farm wagons may be used, however the coupling and reach pole between the axles is slightly modified in order to be especially adapted for the purpose intended. Such modifications will be described hereinafter. It is also desirable that the rear axle should be longer than the axle usually employed upon a farm wagon in order that the rear wheels may be spaced further apart. In order to accomplish such longitudinal extension of the rear axle supplemental spindles are provided which are applied to the spindles of the axles and upon which the rear wheels are journaled.

The supplemental spindles 1 are provided with the enlarged ends 2 which in turn are provided with the recesses 3 which are adapted to receive the spindles 4 of the rear axle 5. The recesses 3 are provided with screw threads 6 which are adapted to engage the nut thread at the end portion of the spindles 4. The wagon wheels 7 are journaled upon the spindles 1. The spindles 1, together with the enlarged ends 2, may be of any desired length thus the rear axle may be extended or lengthened to any extent or degree desired. In as much as the exterior dimensions of the spindles 1 are the same as the exterior dimensions of the spindles 4, the wheels that are usually mounted upon the spindles 4 may be mounted upon the spindles 1, consequently, the interior dimensions of the recess 3 must correspond with the exterior dimensions of the spindles 1.

The elongated box coupling 8 is attached at its rear end to a cross piece 9 which lies upon the axle 5 and which is secured thereto by means of the clamps 10 and bolts 11. The reach pole 12 is connected at its forward end with the front axle 13 and is provided at its rear end portion with an elongated opening 14 which receives the bolt 15 that passes transversely through the box coupling 8. The forward ends of the hounds 16 are also connected to the box coupling 8 by means of the bolt 15 and the rear ends of the said hounds are made fast to the axle 5. The box coupling 8 is provided upon its under side with the longitudinally disposed guides 17. The bar 18 has its end portions lying between the guides 17 and is provided with a block 19 which lies under and operates against the lower side of the guides 17. The forward end of the bar 18 is fixed to the reach pole 12. The cuff 20 is hinged to the rear edge of the cross piece 9 and the sill 21 is carried by the said cuff. The said sill may be adjusted longitudinally in the cuff and when in proper or desired position is secured in such position by means of a set screw 22 or other securing device. The rear side of the cuff 20 is provided with the tines 23. Said tines are preferably three in number and triangularly positioned upon the said cuff. The plates 24 are hinged to the cross-piece 9 and extend transversely with relation to the axle 5. A spring 25 is also provided for each plate 24, the said springs being confined at one end to a stationary point and bearing at their opposite ends against the sides of the plates 24. The plates 24 coöperate with the clamp plates 10 to form rope clamps. The rope or cable 26 is attached at its ends to the block 19 and at its side portions passes between the plates 24 and 24′ and along the outer edges of the plates 10. The said cable is provided with the knots 27. The cable 28 is attached at its rear end to the upper end of the sill 21 and is adapted to be secured at its forward end to the axle 13 or the forward portion of the reach pole 12 or any other device for drawing the said cable.

The operation of the shock handler is as follows:—The apparatus is backed up to the side of a shock and as the rear wheels 7 are sufficiently spread apart to receive the shock the tines 23 pierce and impale the shock. The intermediate portion of the cable 26 is then passed around the shock and under the upper tine 23. The draft animals are then started and by reason of the elongated perforation 14 in the reach pole 12 receiving the pin 15 the said reach pole moves longitudinally with relation to the box coupling 8 which, for the time being, remains stationary. As the block 19 moves with the reach pole 12 the cable 26 is drawn taut around the shock which is firmly and securely impaled upon the tines 23. As the cable 26 is drawn between the clamp plate 24 and clamp plate 10 the edges of the said plates come in contact with the knots 27 and prevent the said cable from moving in a rearward direction. The draft animals are then backed and the reach pole 12 is moved into the box coupling 8. The forward end of the cable 28 is then made fast to the forward portion of the reach pole 12 on the axle 13 and the draft animals are then started up. At the initial movement of the draft animals in a forward direction the cable 28 is tightened and the sill 21 and cuff 20 are swung from a vertical position into a horizontal position over the axle 5. Thus the shock is lifted bodily from the ground and when the end of the perforation 14 arrives at the bolt 15 the entire apparatus begins to move over the surface of the ground. To deposit the shock the operation above described is reversed. However, when it is lowered into vertical position one of the clamp plates 24 is swung back upon its hinges against the tension of the spring 25 when the said plate is moved far enough away from the plate 24' in order to permit the knots 27 of the cable 26 to pass between the said plates. Thus the shock is released and deposited in upright position.

It is obvious that the means for drawing the cable 26 and 28 as shown and described may be changed, or entirely done away with and substituted by any other suitable means commonly employed for drawing such elements.

Having described my invention what I claim as new and desire to secure by Letters-Patent is:—

1. A shock handler comprising a wheel mounted axle, a cuff supported thereby and adapted to swing, an adjustable sill carried by the cuff, said cuff having means for engaging the shock and means for swinging the sill and cuff.

2. A shock handler comprising a wheel mounted axle, a cuff mounted thereon and adapted to swing, a cable coöperating with the cuff in retaining a shock, means for drawing said cable, clamping devices for holding said cable taut about the shock and means for swinging said cuff.

In testimony that I claim the foregoing as my own, I have hereto affixed my signature in the presence of two witnesses.

GEORGE F. PETTIT.

Witnesses:
A. F. HUGHES,
BESSIE BRADDOCK.